United States Patent Office 3,288,410
Patented Nov. 29, 1966

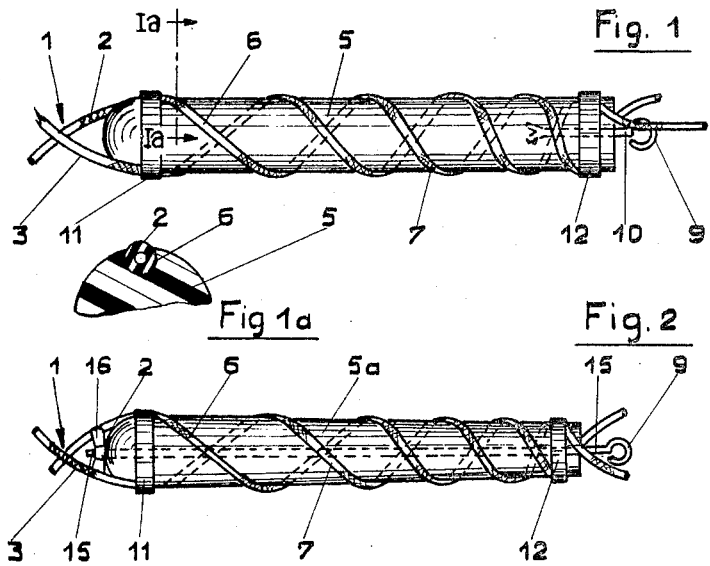
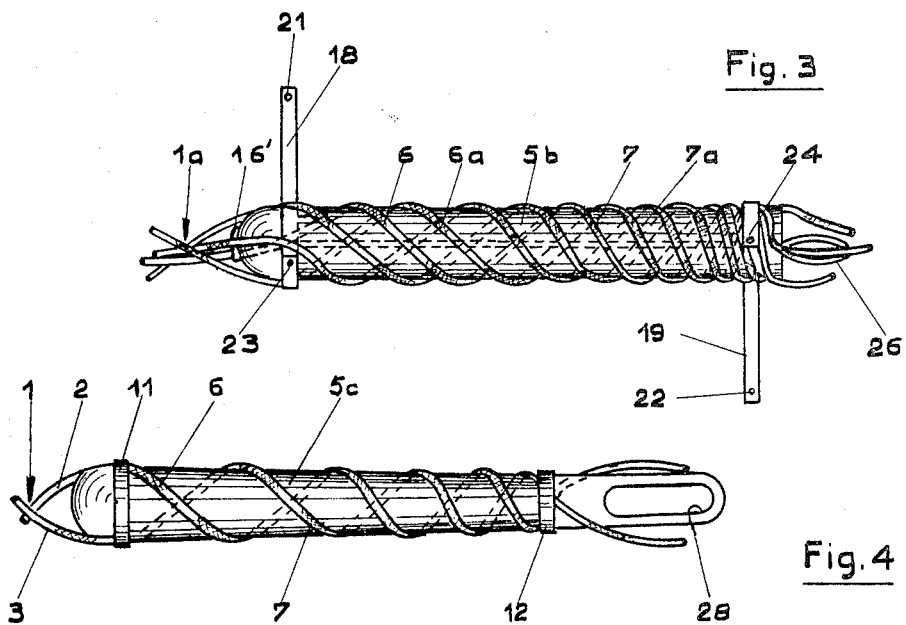

3,288,410
GRIP FOR AN OVERHEAD ELECTRICAL CABLE
André Noirclerc, Versailles, France, assignor to Societe Industrielle de Liaisons Electriques, Paris, France
Filed Nov. 10, 1965, Ser. No. 507,120
Claims priority, application France, Nov. 12, 1964, 994,597, Patent No. 1,426,995
10 Claims. (Cl. 248—63)

This invention relates to grips for multi-strand cables, and particularly to a grip for suspending multi-conductor electrical cables overhead, as from poles and like supports.

The invention is more particularly concerned with the suspending of cables including a plurality of insulation-covered conductors. Such cables are commonly employed for branching circuits of individual consumers from distribution lines, and the invention will be illustrated hereinafter by cable grips primarily intended for such purposes while many other applications will readily suggest themselves to those skilled in the art.

The cable grips employed heretofore are equipped with clamps and other tightening devices whose transverse pressure on the gripped conductors increases with longitudinal tension applied to the cable in order to prevent slipping of the cable from the grip. Most known grips keep the gripped cable under a transverse pressure which is almost uniquely a function of the maximum longitudinal tension applied, that is, they do not, or do not significantly, relax their pressure when the tension is released. Under many conditions of operation, maximum tension is produced in an overhead cable by a load of snow and ice accumulating in winter. A transverse pressure sufficient to prevent cable slippage from the grip is maintained by conventional cables throughout the year.

Yet, most materials employed for electrical insulation in such cables deteriorate under constant pressure. They may creep or fail outright, and failure of insulation at the cable grips is an important factor determining the useful life of branch circuits of rural and similar overhead current distribution systems.

An important object of the invention is the provision of a self-tightening cable grip which exerts transverse pressure on a gripped cable in response to longitudinal tension in the cable, and relaxes such pressure when the cable tension is reduced.

Another object is the provision of a cable grip of the type described which is of simple structure and can be produced at low cost.

With these and other objects in view, the invention, in its more specific aspects, contemplates the use of a cable grip which essentially consists of an elongated core member, preferably of circular cross section, and provided with at least two elongated, approximately parallel, circumferential grooves which extend about the axis of the core member in several screw turns, the axial spacing of the turns of each groove decreasing in a common axial direction. The end portion of the core member at which the groove turns are most closely spaced carries a hook or the like from which the grip and the cable attached thereto may be suspended from a pole or other fixed support.

Other objects, additional features, and many of the attendant advantages of this invention will be readily appreciated as the same becomes better understood by reference to the following detailed description when considered in connection with the accompanying drawings wherein:

FIG. 1 shows a cable grip of the invention and a gripped two-conductor cable in side elevation;

FIG. 1a is a fragmentary sectional view of the device of FIG. 1 on an enlarged scale, the view being taken on the line Ia—Ia;

FIG. 2 illustrates a modified grip of the invention for a two-conductor cable;

FIG. 3 illustrates a cable grip for a four-conductor cable; and

FIG. 4 shows a cable grip for a two-conductor cable similar in many aspects to that of FIG. 2, the views of FIGS. 2 to 4 corresponding to that of FIG. 1, and the cross sectional view of FIG. 1a being representative, within obvious limits, of the devices illustrated in FIGS. 2 to 4 as well.

Referring now to the drawing in detail, and initially to FIGS. 1 and 1a, there is seen a generally cylindrical core member 5 of weather-resisting plastic having one flat end face and one hemispherical end face and formed with two approximately helical or screw-shaped, right handed grooves 6, 7. The pitch of each groove 6, 7 decreases from the hemispherical toward the flat end face of the core member 5 in a substantially uniform manner.

The grooves 6, 7 are axially or longitudinally open and receive the two insulated conductors 2, 3 which form the strands of a cable 1 only partly seen in FIG. 1. It will be understood that the conductors 2, 3 are helically wound about each other in the non-illustrated portion of the cable in which the insulated conductors are enveloped by a common outer shell in a conventional manner.

Two tie bands 11, 12 concentrically mounted on respective axial end portions of the core member 5 consist of somewhat resilient plastic, and are held in position over the longitudinally terminal portions of the grooves 6, 7, and over the conductors 2, 3 received therein by their resilience, thus preventing radial escape of the conductors 2, 3 from the associated grooves when the cable 1 is slack, as during installation of the grip-mounted cable on a pole and the like.

The bright portion or eye 9 of a metal hook projects axially from the flat end face of the core member 5. The stem 10 of the hood is embedded in the plastic material of the core member and is secured against axial displacement by transversely spread parts of the forked inner end of the stem 10. The core member 5 is preferably made by molding, and the hook is fastened in the mold in a conventional manner before the fluid plastic enters the same.

The cable 1 is attached to the core member 5 by first slipping the two tie bands 11, 12 over the cable 1, removing the non-illustrated outer shell over a suitable length of the cable, spreading the exposed conductors 2, 3 apart, inserting the core member 5 between the spread conductors, laying the conductors into the grooves 6, 7, and securing them by the bands 11, 12. The grip with the cable mounted thereon may then be attached to a pole or other support by the eye 9 of its hook.

When axial tension is applied to the cable in a direction away from the hemispherical end of the grip, the cable conductors 2, 3 frictionally engage the walls of the associated grooves 6, 7. The frictional forces exerted depend in part on the properties of the materials which constitute the outer engaging surfaces of the conductor strands and of the grooves.

The tension in the conductors 2, 3 received in the grooves 6, 7 decreases from the hemispherical or free end of the core member 5 toward the flat or hooked end of the core member because of the frictional engagement with the groove walls. The pitch of the groove determines the portion of the tension component at right angles to the direction of the elongation of the groove and is another important factor in determining the friction forces exerted by the groove walls on the conductors 2, 3.

If the grooves 6, 7 were precisely helical so that they would lie along straight parallel lines when the surface of the core member 5 is developed, the friction between the groove walls and the conductors would gradually decrease from a maximum near the open end of each groove at the hemispherical end face of the core member. Because of the decreasing pitch of the grooves, the friction force is more uniformly distributed over the length of the conductor received in the groove. The proper rate of pitch decrease for any combination of materials and service condition can readily be determined by experiment in such a manner that the friction is substantially uniform over the entire engaged length of the conductor. The maximum transverse force exerted on the insulating material at a given axial tension applied to the cable is smallest when the transverse force is most uniformly distributed.

Under otherwise similar conditions, the cable insulation has a longer useful life on the cable grip of the invention than on grips having exactly helical grooves.

The cable grip shown in FIG. 2 has a frustoconical core member 5a which has one flat and one hemispherical end face, and tapers from the latter toward the former end face. The core member 5a has an axial bore in which a straight metal rod 15 is freely slidable. The end of the rod 15 projecting from the flat end face of the core member 5a is arcuately bent to constitute an eye or bight portion 9. The end of the rod 15 projecting from the hemispherical end face of the core member 5a is threaded and carries a wing nut 16.

The core member 5a has two screw-shaped grooves 6, 7 in its conical face, and conductors 2, 3 of a two-conductor cable 1 are received in the grooves and prevented from escaping the grooves by tie bands 11, 12 in the manner described above with reference to FIG. 1.

The conical shape of the core member 5a causes a more rapid increase in the transverse component of the tension forces from the free toward the hooked end of the core member 5a than occurs under otherwise comparable conditions in the core member 5 illustrated in FIG. 1. The conical core member thus is preferably employed where the coefficient of friction between the materials of the core member and of the insulation on the conductors 2, 3 is particularly low, and where it is desired to reduce the number of turns of the grooves.

The hook arrangement illustrated in FIG. 2 permits the sag of the cable 1 to be adjusted in a very convenient manner after the grip with the attached cable has been suspended from a support. It is merely necessary to turn the wing nut 16 in the desired direction.

FIG. 3 shows a cable grip of the invention designed for use with cables having as many as four conductors or four strands not necessarily all conductive. The core member 5b shown in FIG. 3 is generally cylindrical with one hemispherical and one flat end face. The cylindrical surface is formed with four grooves 6, 6a, 7, 7a which are approximately parallel and whose pitch decreases approximately uniformly from the hemispherical toward the flat end face of the core member 5b.

The core member 5b consists of injection molded polyvinyl chloride composition and is integral with two tie bands or straps 18, 19 on its two axial ends respectively. Because of its relatively great thickness, the core member 5b itself is only slightly resilient, but the thin straps 18, 19 are pliable and quite resilient. The central portions of the bands are integrally fastened to the core member. The two free ends respectively carry integral snap fastener 21, 22 and are formed with eyelets 22, 23. When the snap fasteners engage the eyelets, the straps 18, 19 hold the cable strands in their respective grooves when the cable is slack. When the cable is under tension, the straps 18, 19 are not needed.

The attaching device for securing the core member 5b to a pole or to the wall of a building includes a cotter pin 26 whose bight portion projects from the flat end face of the core member 5b, and whose two legs freely pass through an axial bore in the core member 5b. The free ends of the pin 26 project from the hemispherical end face of the core member and are bent over as shown at 16'.

The grip shown in FIG. 4 differs from that illustrated in FIG. 2 mainly by an eye 28 on the narrow axial end portion of its frustoconical core member 5c which is integral with the core member. The core member 5c and the eye 28 are integrally formed in a single injection molding operation. The arrangement is otherwise as in FIG. 2.

Obviously, many of the features shown in the several figures of the drawing and described hereinabove are interchangeable between the several specific embodiments disclosed. The integrally molded eye 28, for example, may replace the several hook or cotter pin arrangements shown in FIGS. 1, 2, or 3, and vice versa, and other permutations and variations are too obvious to require more detailed description.

Plastics are the preferred materials of construction for the core members, and both thermoplastic and thermosetting materials may be employed, the specific formulation of the material depending on the service conditions to be recountered. Ceramic insulating materials such as porcelain, and even metals are useful materials of construction, and the electrical conductivity and frictional properties of the core members may be modified as needed by surface coatings in a known manner.

While grooves which have open orifices in the end faces of the core member are preferred, and have been illustrated, it is not necessary that the grooves actually extend over the full longitudinal surface of the core member. Their terminal portions, however, should be axially or longitudinally open. This may be achieved by gradually reducing the depth of the groove so that its bottom ultimately joins the outer surface of the core member.

The depth of the groove is readily selected for the intended purpose. A groove depth of about ¾ of the diameter of an insulated conductor to be received therein, as shown in FIG. 1a, is generally satisfactory.

The core member 5b shown in FIG. 3 and having four approximately parallel grooves may be employed for securing a cable having only two conductors, or for securing a cable having more than four conductors by inserting more than one conductor in each groove if the conductors are of sufficiently small size.

The hemispherically rounded end face shown in all core members of the invention has been found to facilitate mounting of the cable on the grip, but is not in itself essential for operativeness of the grip. The configuration of the other end face, shown to be flat and radial in all illustrated embodiments, is even less important.

It should be understood, of course, that the foregoing disclosure relates only to preferred embodiments of the invention, and that it is intended to cover all changes and modifications of the examples of the invention chosen for the purpose of the disclosure which do not constitute departure from the spirit and scope of the invention set forth in the appended claims.

What is claimed is:
1. A grip for a cable having a plurality of strands comprising, in combination:
   (a) an elongated core member having a longitudinal axis and a longitudinal face about said axis; and
   (b) hook means on one longitudinal end portion of said core member for suspending the same,
      (1) said face being formed with a plurality of screw-shaped elongated grooves, each groove extending about said axis in a plurality of turns, the axial spacing of the turns of each groove decreasing in an axial direction toward said one end portion from the other end portion.

2. A grip as set forth in claim 2, wherein said grooves are approximately parallel.

3. A grip as set forth in claim 2, wherein said grooves are longitudinally open.

4. A grip as set forth in claim 1, wherein said axial spacing decreases continuously from said other end portion to said one end portion.

5. A grip as set forth in claim 1, further comprising releasable tie means on at least one of said end portions for retaining a cable strand in each of said grooves.

6. A grip as set forth in claim 1, wherein said core member is of substantially circular cross section about said axis.

7. A grip as set forth in claim 6, wherein the diameter of said cross section decreases from said other toward said one end portion.

8. A grip as set forth in claim 1, wherein said hook means includes a stem portion, a bight portion fixedly fastened to said stem portion and axially extending from said one end portion of the core member in a direction away from the other end portion, and fastening means securing said stem portion on said core member against axial displacement.

9. A grip as set forth in claim 8, wherein said fastening means include means for holding said bight portion in each of a plurality of positions relative to said core member, said positions being spaced from each other in the direction of said axis.

10. A grip as set forth in claim 8, wherein said grooves are approximately parallel and longitudinally open in both directions, the axial spacing of the turns of said grooves decreases approximately uniformly from said other end portion toward said one end portion of the core member, and the core member is of substantially circular cross section, the grip further including releasable tie means on each of said end portions for retaining a cable strand in each of said grooves.

References Cited by the Examiner

UNITED STATES PATENTS

| | | | |
|---|---|---|---|
| 2,398,013 | 4/1946 | Kyle | 24—115 |
| 2,681,781 | 6/1954 | Kellems | 248—60 |
| 2,698,150 | 12/1954 | Palma | 248—63 |
| 3,216,682 | 11/1965 | Lewis | 248—60 |

CLAUDE A. LE ROY, *Primary Examiner.*